United States Patent

Flasch, Jr.

[11] Patent Number: 5,852,896
[45] Date of Patent: Dec. 29, 1998

[54] CONTAINER AND METHOD OF GROWING A PLANT

[76] Inventor: Robert J. Flasch, Jr., 6310 Co. Rd. 18, Orland, Calif. 95963

[21] Appl. No.: 966,685

[22] Filed: Nov. 10, 1997

[51] Int. Cl.$^6$ .................................................... A01G 25/00
[52] U.S. Cl. ................................................. 47/79; 47/48.5
[58] Field of Search .................................. 47/71, 73, 75, 47/79, 80, 81, 58, 48.5

[56] References Cited

U.S. PATENT DOCUMENTS

| | | |
|---|---|---|
| 82,052 | 9/1868 | Whitman . |
| 576,850 | 2/1897 | Iken . |
| 627,231 | 6/1899 | Hinrichs . |
| 1,272,713 | 7/1918 | Reily ........................................ 47/79 |
| 1,317,569 | 9/1919 | Forster ..................................... 47/79 |
| 3,243,919 | 4/1966 | Carlson .................................... 47/79 |
| 4,040,207 | 8/1977 | Lancaster . |
| 4,160,342 | 7/1979 | Dryer . |
| 4,557,070 | 12/1985 | Oyama . |
| 4,745,707 | 5/1988 | Newby ..................................... 47/79 |
| 5,044,120 | 9/1991 | Couch ...................................... 47/79 |
| 5,272,835 | 12/1993 | Stern ........................................ 47/79 |

Primary Examiner—Thomas B. Will
Assistant Examiner—Robert Pezzuto

[57] ABSTRACT

A container and methodolgy for growing a plant in soil, the soil within an area defined by an annular inner wall having an open top end to expose the soil and plant to ambient air; the inner wall includes transverse holes around its circumference and up its length. In one embodiment the inner wall includes a water impervious circumferal band at its upper end to help maintain the soil top surface dry. An outer annular wall of water impervious material laterally surrounds, in spaced relationship, the inner wall to define an open space with upper opening between the walls into which water can be applied and air may flow. The space between the walls at the bottom end thereof is sealed with a floor leaving only the transverse holes in the inner wall as flow paths through which the water enters the soil from the space. The volume of the space between the walls is sufficient to receive enough water to saturate the soil and provide some excess water for removing salts from the soil. A bottom floor spanning or beneath the bottom of the inner wall includes drain holes through which the excess water having entered the soil may drain, and thereafter through which air may enter. The soil percolation rate primarily controls the flow rate of water from the space into the soil.

9 Claims, 7 Drawing Sheets

CONTAINER AND METHOD OF GROWING A PLANT

BACKGROUND OF THE INVENTION

1. Field of the Invention

The present invention relates to containers or pots, particularly dual-walled pots which hold soil or the like media in which plants may be grown. Methodology for growing a plant in a container, particularly irrigating and aerating soil within the container are also disclosed.

2. Description of the related Prior Art

While there are a large variety of differently structured plant pots, dual-walled plant pots and methods for growing a plant in containers in the prior art, none are the same as the present invention, and none provide all of the advantages of the present invention.

Some of the problems associated with growing a plant in a pot or like container include: under-watering; over-watering; rain water containment and resultant root rot due to insufficient drainage and aeration if the pot is outdoors; excessive inorganic salt build-up in the soil; algae growth on the top surface of the soil when the soil is maintained excessively wet; deflocculation of the top of the soil resulting in reduced aeration due to a build-up of inorganic salts or algae growth; algae and bacterial growth in water stored long-term in a slow-feed water reservoir; insufficient aeration of the roots of the plants; and the floating of some of the surface soil out of a container when surface water is applied for irrigation, with many of the above problems capable of killing or damaging the potted plant. Although it is difficult to eliminate all possible problems associated with growing potted plants, particularly those problems resulting directly from action or inaction by the gardener, for many decades on-going developments have been made in pot structures for growing plants in an attempt to produce an easy to use, low maintenance, error-resistant and effective pot structure and method of use capable of encouraging a plant to thrive.

A prior art pot which I believe is relevant is shown in U.S. Pat. No. 576,850 issued to H. Iken on Feb. 9, 1897. The Iken flower pot includes a metal dual-wall structure with the inner wall having holes for providing aeration of the soil and roots. The Iken pot lacks a floor at the lower end between the inner and outer walls, and therefore requires the user to apply the water directly onto the top of the soil, a practice which can float soil out of the container, lead to an accumulation of undesirable inorganic salts left on the surface by surface evaporation, and a higher incidence of algae growth, and deflocculation of the soil surface among other potential problems. Additionally, when water is applied directly to the top of the soil in a pot, the top of the soil is wet and exposed to ambient air, a condition which causes the evaporation of not only the soil top surface water, but one which leads to an overall increase of the drying rate of the soil beneath the surface layer as water beneath the upper soil layers moves upward toward the soil top surface whereat it evaporates into the ambient air.

Another prior art pot which I believe is relevant is shown in U.S. Pat. No. 627,231 issued Jun. 20, 1899 to G. H. Hinrichs for a flower pot. The Hinrichs pot is a dual-walled annular pot-like insert to define a slow-feed water reservoir for insertion into a conventional pot. The Hinrichs insert is made of burnt clay to provide a porous material with a porosity to only gradually deliver water from the water storage reservoir of the insert to the soil within the central opening of the insert, with the water delivery from the filled reservoir to the soil being over an extended period, such as several to many days. With the Hinrichs pot, it is the very small nature of the pores of the clay which regulate the rate at which the water flows from the space into the soil. And since the small pores of Hinrichs's pot are normally filled with water, air cannot normally move from within the lateral space into the soil, at least not in any appreciable amount. A drain hole is shown in the center of the conventional pot beneath the soil. Water gradually entering the soil through the fine pores of the burnt clay can flow directly onto the top surface of the soil from the reservoir. Reservoir type pots for plants typically hold water in the reservoir sufficiently long to allow substantial bacterial and/or algae growth to occur, with many types of bacterial and algae growths producing wastes pathogenic to the plant if the roots of the plant come into long term contact therewith. Additionally, if the soil is continuously saturated or continuously too moist as can easily be the case with slow-feed reservoir type pot watering systems, there is little air in the soil, since generally speaking, water displaces the air.

Another prior art pot which I believe is relevant is shown in U.S. Pat. No. 82,052 issued Sep. 8, 1868 to E. Whitman for a flower pot having dual-walls and a removable cap at the upper end of the walls. The Whitman pot is made of porus pottery-clay and includes two walls spaced apart from one another and having a floor at the lower end of the walls to define a slow-feed water reservoir between the walls which gradually delivers water to the soil through the fine pores of the pottery over an extended period, such as several or many days. Like that of the Hinrichs pot, with the Whitman pot it is the very small nature of the pores of the pottery which regulate the rate at which the water flows from the space into the soil. And since the small pores Whitman's pot are normally filled with water, air cannot normally move from within the space into the soil. A drain hole is provided in the center beneath the soil. Water entering the soil through the fine pores can flow directly onto the top surface of the soil from the reservoir. The Whitman reservoir pot is potentially subject to insufficient soil aeration among other plant damaging problems.

Another prior art pot which I believe is relevant is shown in U.S. Pat. No. 4,040,207 issued Aug. 9, 1977 to W. R. Lancaster for a self-fertilizing pot comprising a dual-walled plastic pot having a water reservoir between the two walls and slits through the inner most wall to allow water to flow from the reservoir into the soil containing area. Fertilizer pellets are contained within the space between the two walls and add nutrients to the water. The Lancaster pot does not include a drain hole for allowing excess water to drain from the pot and soil, and therefore excess water in the container and soil could rot the plant roots due to insufficient aeration, and the accumulation of chemical salts would soon prove toxic to root tissue.

Another prior art pot which I believe is relevant is shown in U.S. Pat. No. 4,557,070 issued Dec. 10, 1985 to G. C. Oyama for a plant pot with moisturizing and aeration means. The Oyama patent also describes and details a substantial amount of additional prior art which may be relevant to the present invention. The Oyama patent generally describes two embodiments of plant pots both of which are dual-walled containers. The first embodiment is a reservoir style plant pot having a lower outer container absent a drain hole for holding a reservoir of water in constant contact with slits in an inner container so that the reservoir water can flow through the slits to water the plant in the inner container. The second embodiment of oyama generally comprises an open ended tube having both an open top and open bottom for resting on a moist grow mat. A pot having holes in the bottom rests in-part within the open ended tube.

Another prior art pot which I believe is relevant is shown in U.S. Pat. No. 4,160,342 issued Jul. 10, 1979 to G. M. Dryer for pots for growing plants. The Dryer pot is a dual-wall pot structure with an outer pot structured to hold water as a reservoir, and an inner pot positioned within the outer pot. The inner pot includes holes in its bottom to allow the inflow of water from the outer pot reservoir into the inner pot for maintaining the soil within the inner pot moist. The Dryer arrangement wherein the top of both the inner and outer pots are open and aiming upward, and without any type of drain hole in the outer pot allows rain water or excess water applied by the gardener to completely fill both pots. Many types of potted plants are grown outdoors when temperatures are not excessively cold, and should it rain on a pot arrangement such as that of Dryer's, the rain water within the inner and outer pots will seek a common level through the holes in the bottom of the inner pot. Should the rain be sufficient, both the inner and outer pots, including the plant root containing soil in the inner pot will be completely filled with water. Should the gardener not inspect the pot, and since it has recently been raining the gardener is not likely to inspect the pot for dryness or need of watering, then the plant roots will be in effect submerged in water and thus deprived of oxygen which will kill or seriously damage the plant. The above mentioned Lancaster pot will have the same rain water filling problem, as will most if not all dual-walled pots which are absent drain holes for draining excess water from the outer pot.

I believe there still exists a need for further improvement in plant pots and in methods of aerating and irrigating plant pots, and the present invention provides such improvement as will become appreciated.

SUMMARY OF THE INVENTION

Disclosed are plant containers or pots in which a plant or plants may be grown, and methodology for improving plant growth in a pot or container. The present invention provides novel structuring and methodology allowing for proper or improved aeration, irrigation, and drainage of the plant root-containing soil in a simple to use error-resistant plant container for indoor or outdoor use to achieve healthy growth of the plant(s).

In brief, a container in accordance with the present invention is a container for growing a plant in soil, the soil within an area primarily defined by an inner annular wall having an open top end to expose the soil and plant to ambient air; the inner wall includes transverse holes around its circumference and up its length. In one embodiment, the inner wall includes a water impervious circumferal band at its upper end to help maintain the soil top surface dry by preventing the lateral in-flow of irrigation water, and in another embodiment the upper end of the inner wall and top surface of the soil are elevated to prevent the lateral in-flow of irrigation water onto the soil top surface. An outer annular wall of water impervious material laterally surrounds, in spaced relationship, the inner wall to define an open space with upper opening between the walls into which irrigation water can be applied and air may flow. The space between the walls at the bottom end of the space is sealed with a floor leaving only the transverse holes in the inner wall as flow paths through which the water enters the soil from the space. The volume of the space between the walls is sufficient to receive enough irrigation water in a single filling operation by the gardener to saturate the soil and provide some excess water for removing or flushing inorganic salts from the soil. A bottom floor spanning or beneath the bottom of the inner wall and soil includes drain holes through which the excess water having entered the soil may drain, and thereafter through which air may enter. The soil percolation rate preferably primarily controls the flow rate of water from the space into the soil, and the flush water is allowed to drain from the soil and container at a rapid rate in order to allow further or generally uninterrupted aeration of the soil.

An object of the present invention is to provide a container or pot for holding soil in which to grow a plant, wherein healthy plant growth may be achieved.

A further object of the invention is to provide improved methodology for growing a plant in a container.

A further object of the invention is to provide a plant container in which healthy plant growth may be achieved, and which is structured to reduce or eliminate the build-up of undesirable plant damaging inorganic salts within the soil in order to provide for healthier plant growth and to eliminate or make less frequent the need to replace excessively salty soil in the pot with fresh soil.

A further object of the invention is to provide a plant container which is structured to meet the aforementioned objects and further to help prevent soil top surface deflocculation leading to poor aeration.

A further object of the invention is to provide a plant container which is structured to meet the aforementioned objects and further to help maintain the top surface of the soil dry, at least in non-rainy situations, to provide a dry top surface of the soil to provide a slowing effect to the water and water vapor moving upward from deeper in the soil, and this to reduce surface evaporation and reduce the needed frequency of watering of the soil, and to reduce surface salt accumulation and algae growth.

A further object of the invention is to provide a plant container which is structured to meet the aforementioned objects and further to prevent excessive standing water in the soil and on the roots of a plant to provide improved aeration.

A further object of the invention is to provide a plant container which is structured to meet the aforementioned objects and further to provide multiple air entry points into the soil to provide complete aeration of the soil and thus roots of the plant(s) within the container.

A further object of the invention is to provide a plant container which is structured to meet the aforementioned objects and further to provide multiple irrigation water entry points into the soil to provide uniform moistening of the soil beneath the dry or relatively dry soil top surface.

A further object of the invention is to provide a plant container which is structured to meet the aforementioned objects and further to provide a plant container feasible for growing healthy plants indoors, and one which can also be used outdoors even during a rainy season without the container filling with standing water.

A further object of the invention is to provide a plant container which is structured to meet the aforementioned objects and further to be readily manufactured such as with known manufacturing methods and materials so that the plant container may be manufactured and sold relatively inexpensively.

A further object of the invention is to provide a plant container which is structured to meet the aforementioned objects and further to be readily shipped, wherein the container is dismantlable and nestable to reduce shipping volume, and even further wherein the container is durable.

These, as well as other objects and advantages of the present invention will become increasingly understood and appreciated with continued reading and with an examination of the included drawings.

BEST MODES FOR CARRYING OUT THE INVENTION

Figure 1:
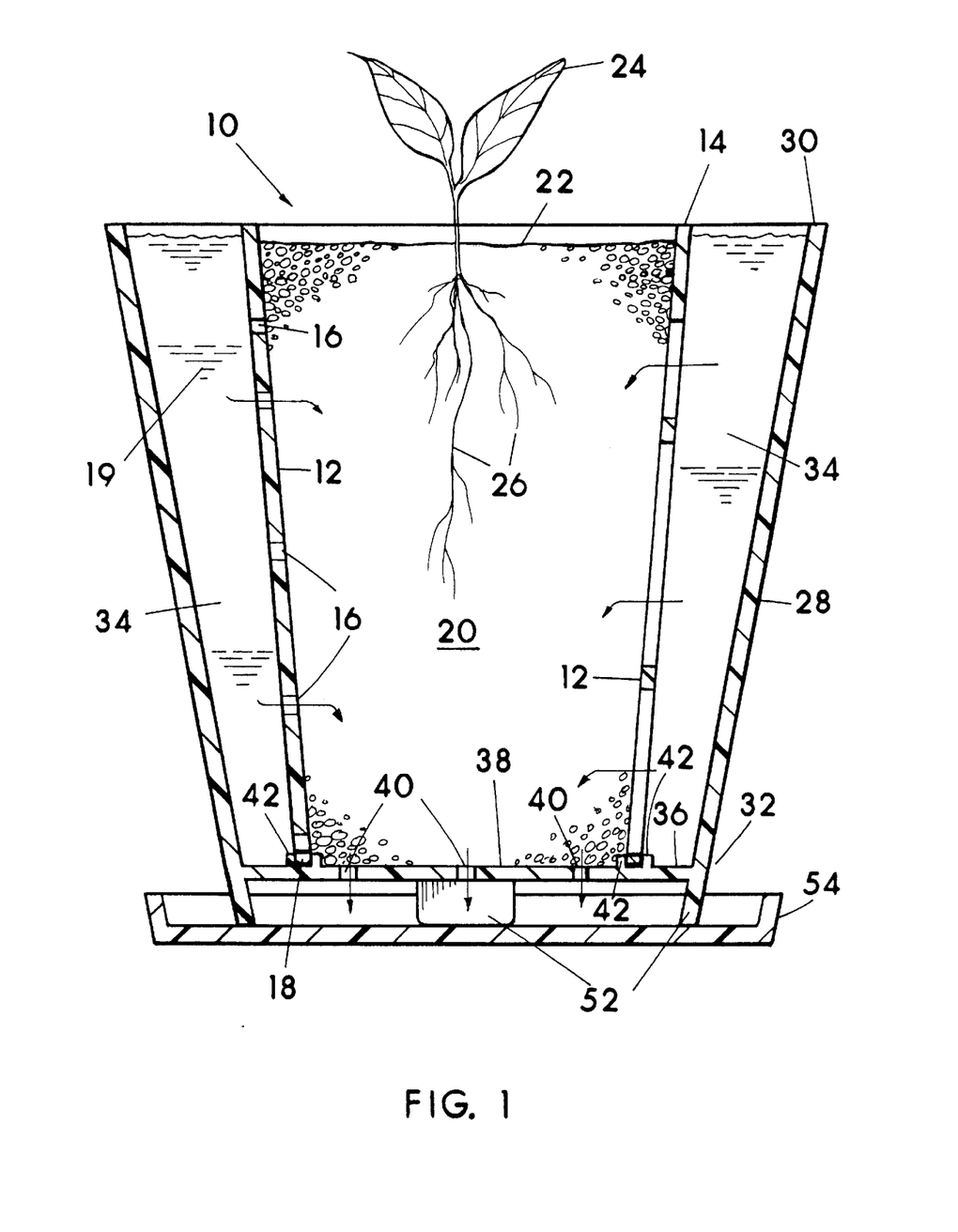
FIG. 1 shows, in a cross sectional side view, a container or pot in accordance with the present invention with soil supporting a plant growing therein. This view shows, through the use of arrows, irrigation water flowing into and out of the soil, and then out of the container. An optional excess water catch-pan is shown beneath the pot.
Figure 2:
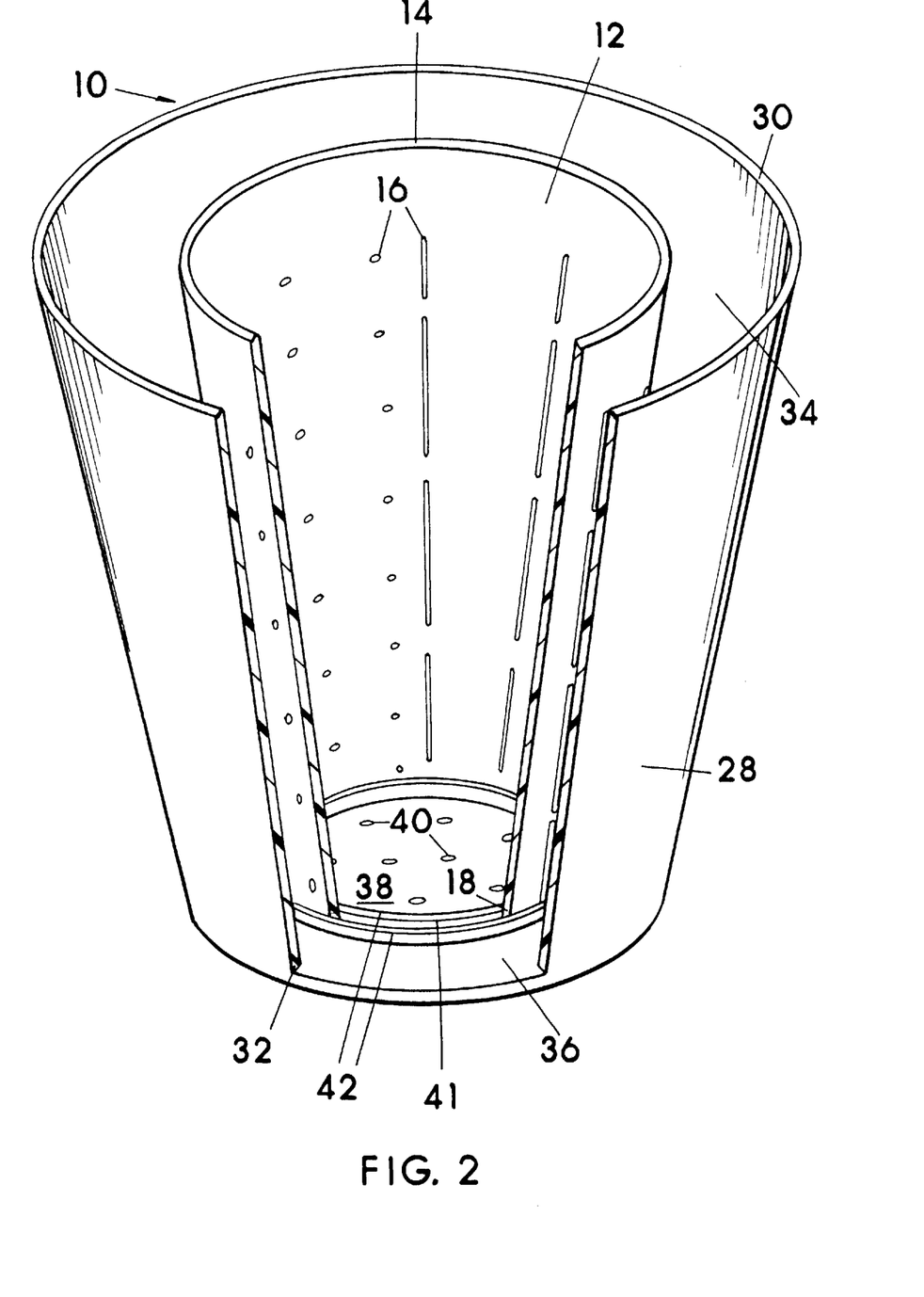
FIG. 2 is an top side perspective view including a cut-away of a container in accordance with the present invention and which is generally the same container as shown in FIG. 1.
Figure 3:
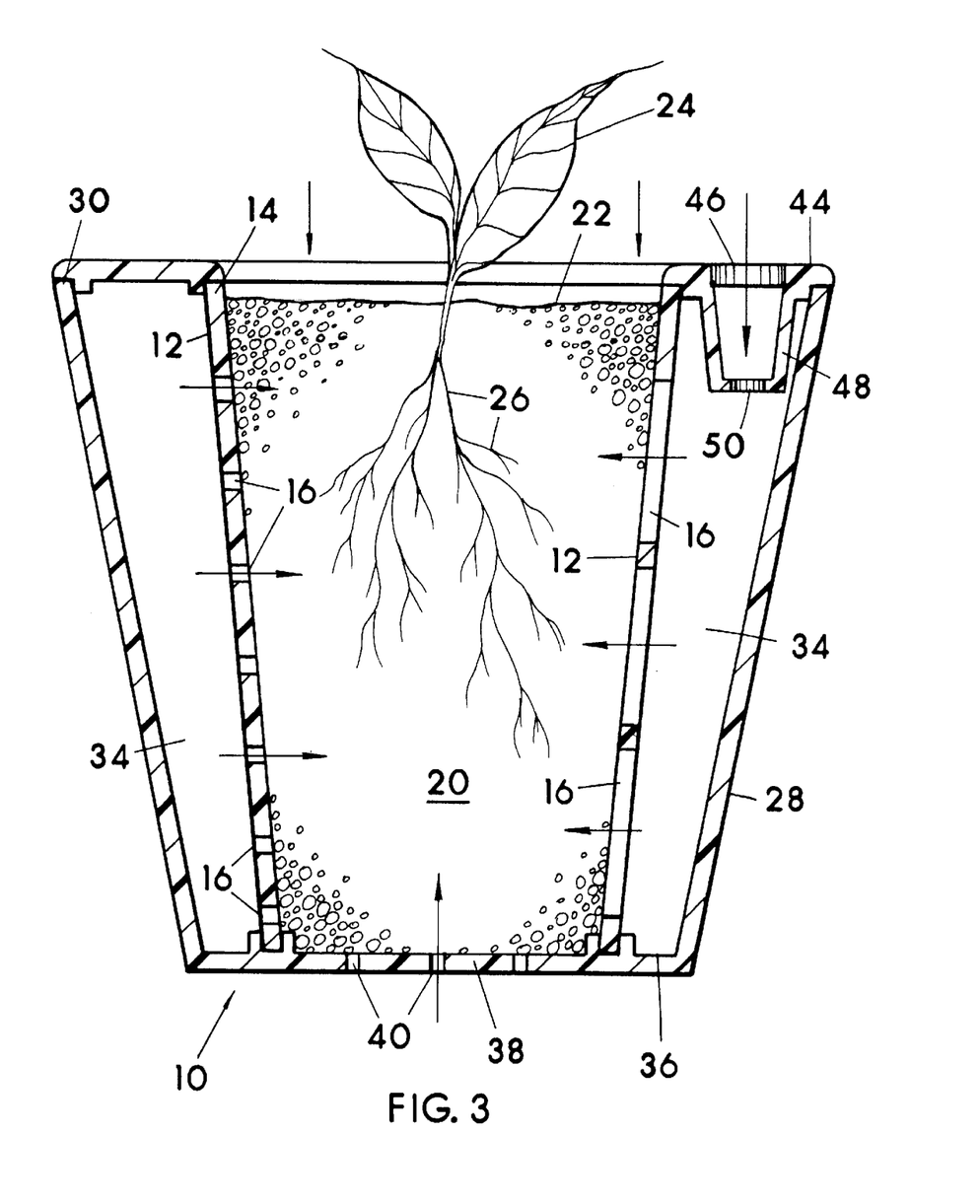
FIG. 3 shows, in a cross sectional side view, a container which is generally the same container as shown in FIG. 1 with soil supporting a plant growing therein. This illustration shows, through the use of arrows, air flowing into the soil basically from all directions. Also shown is an optional cover on the top of inner and outer walls.
Figure 7:
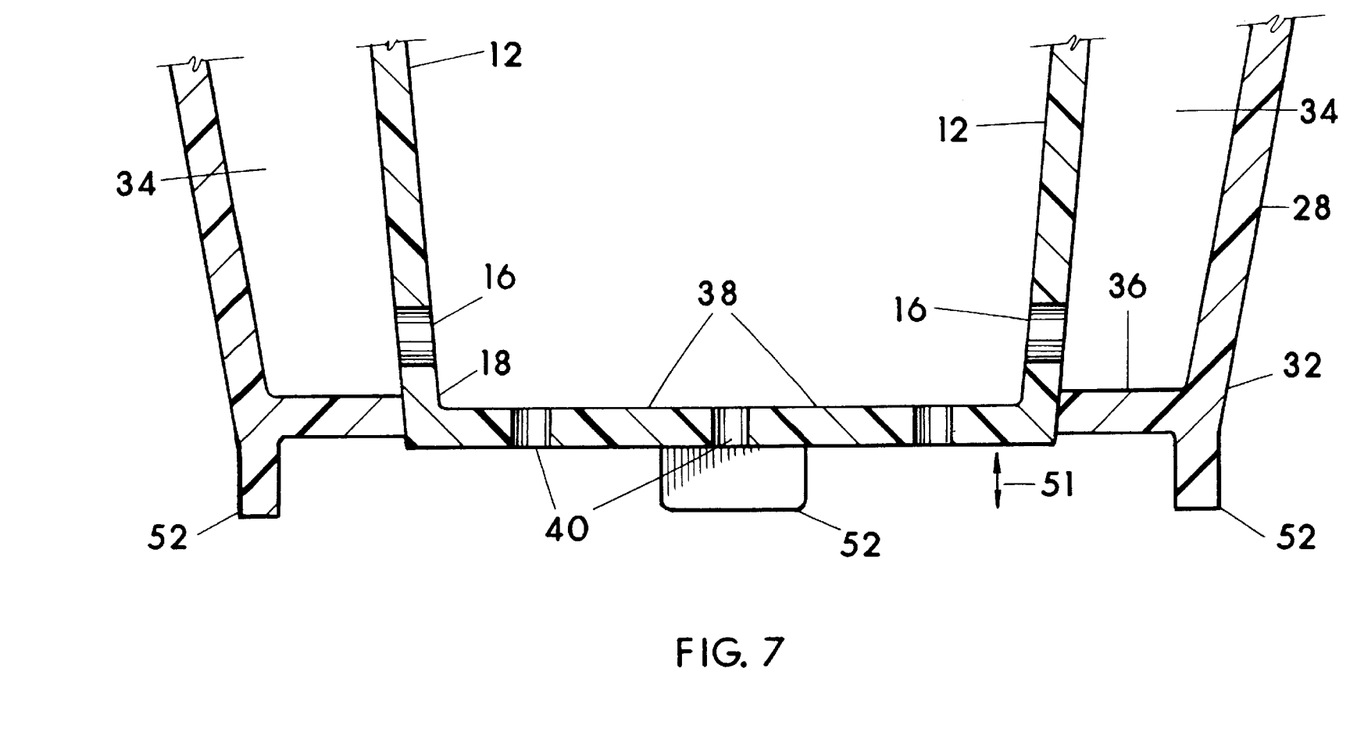
FIG. 7 shows a bottom end cross sectional side view of a container in accordance with the present invention and slightly modified from the container of FIGS. 1–3.
Figure 8:
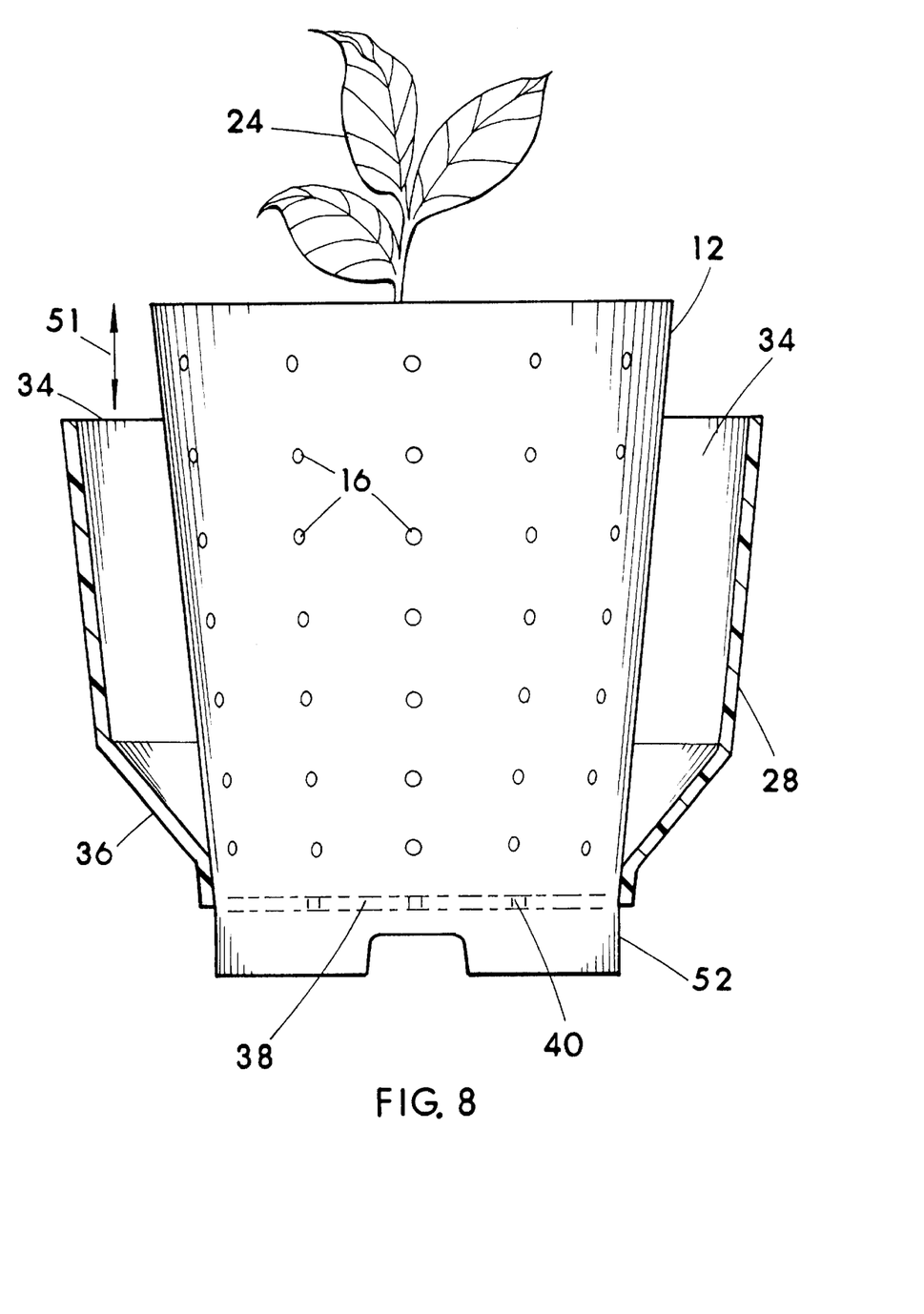
FIG. 8 shows, in a cross sectional side view, a container in accordance with the present invention and slightly modified from the containers of FIGS. 1–3, and 7.

With reference now to the drawings in general for a detailed description of how to build and use containers in accordance with the present invention by way of the shown container 10 in FIGS. 1–3 for example, and the modified containers of FIGS. 7 and 8 all which are in accordance with the present invention. Some variations of how to build a container in accordance with the present invention will also be described. Methodology to using a container in accordance with the present invention, and to growing a healthy plant in a container should become readily understood with continued reading. The term "soil" as herein used generally means dirt or earth, but also can include in its meaning suitably firm or stiff plant root supporting materials such as plastic beads, expanded perlite, expanded vermiculite or the like, and such materials combined with earth wherein some, most or all of the nutrients for the plant are provided in fertilizer through the water. The present invention is a container and method of growing a plant in a container, such as container 10 for holding a plant 24 or plants with the roots 26 thereof in soil 20 within the container, soil 20 primarily contained within the cylindrical or conically shaped interior boundaries of a vertically extending inner annular wall 12 having an open top end at the top end of container 10 to expose top 22 of soil 20 and plant 24 to the ambient air. Inner wall 12 of container 10 further includes multiple transverse perforations or holes 16 around its circumference and up its length from adjacent a bottom end 18 of inner wall 12 (adjacent sealing floor 36) to a height near top edge 14 of inner wall 12 but significantly below edge 14 and top 22 of soil 20 so that the top of soil 20 remains relatively dry, at least in non-rainy situations. It is desireable to maintain the top 22 of soil 20 dry as detailed above. Holes 16 are water and air breathing holes for allowing water and air to move laterally through inner wall 12 into (or out of) soil 20. Container 10 includes an upper portion or an upper circumferal band of inner wall 12 from the wall top edge 14 adjacent top 22 of soil 20 downward a distance of about ¾ to 1.5 inches below top 22 of soil 20 and edge 14 is water imperious to help maintain the upper surface of soil 20 dry in order to reduce salt build-up from surface evaporation, algae growth from excessive moisture, and surface deflocculation which leads to a reduction of air infiltration capabilities of the upper layers of soil 20. The water impervious circumferential band at the top of inner wall 12 can be varied from the ¾ to 1.5 inches specified above, but somewhere in this range will normally function adequately generally without regard to the volume of soil 20 (size of container 10) held in inner wall 12 and this because the effect of gravity pulling water downward in the soil is approximately the same regardless of the size of container 10, and additionally most soils such as potting soils do not wick liquid water upward in significant amounts or to significant heights through dry soil above a water entrance elevation. It should be noted that air moves more readily through a dry top surface of soil than does water vapor, and so with the present invention including as at least one aspect thereof the desirability of maintaining top 22 of soil 20 allows good air infiltration in and out of top 22 but reduces the water vapor escape rate through the top 22 of soil 20. Soil 20 within container 10 can and should be filled to or quite near the top edge 14 of inner wall 12 since there is no need to have an upward extending lip of inner wall 12 surrounding the soil top 22 to serve as a container to hold standing water until the soil absorbs the water, since the soil 20 is not watered from the top, but through the sides and below its top surface by way of holes 16.

Holes 16 are exemplified in FIG. 2 as circular holes and also as elongated slit style holes, either type as well as other shapes of perforations will function within the scope of the invention, with such perforations or holes 16 being significantly larger than the typical pores of an unglazed porus burnt clay or pottery type grow pot as used in the prior art and described above for gradually delivering water to the soil from a slow-feed reservoir over a period of several to many days and wherein it is the small nature of the pores which regulates the flow rate of water from the reservoir space. The present holes 16 are of sufficient size and number for delivering the water to the soil generally as fast as the soil 20 can receive the water, or in other words it is primarily the soil percolation rate and not the hole size and volume which regulates the transfer rate of water from space 34 (space 34 to be detailed below) into the soil 20 in the present invention. Thus holes 16 are relatively large, maybe ¹⁄₁₆ of an inch across or in diameter, but not so large that significant amounts of soil 20 pour through holes 16. A large number of uniformly spaced holes 16 of about ¹⁄₁₆ inch diameter will usually function well within the scope of the invention in most applications, i.e., soil types and container 10 sizes, although the holes 16 could be somewhat larger (or slightly smaller) than the ¹⁄₁₆ inch specified size. As shown in FIG. 2, holes 16 should be placed generally uniformly about the circumference of inner wall 12 so that water and air from space 34 may enter soil 20 from many different directions, areas and elevations in order to ensure that all except the upper most layers of soil 20 are saturated when space 34 is filled with water 19 by the gardener from a watering can or hose, or by an automatic hose-feed timed watering system as may be used at home or in a commercial nursery.

An outer annular wall 28 of water impervious material surrounds, in spaced relationship, inner wall 12 and terminates at an upper edge 30 thereof in spaced relationship to upper edge 14 of inner wall 12 at the top of container 10 to define an annular space 34 between inner and outer walls 12, 28. Space 34 includes an upper opening or is open circumferentially at its upper end through which water can be applied to fill the space for proper watering of the soil and plant, such as from a watering can or hose pouring water through the open top of space 34, or through hole 46 in cover 44 as will be detailed, to saturate soil 20 below the upper water impervious band of inner wall 12. The water should not be applied directly onto top 22 of soil 20, but rather, should be applied to fill annular space 34 between the two walls 12, 28 whenever the soil and plant need watering, which can be determined by a finger inserted into the top of soil 20 to feel for moisture, through the use of a soil moisture meter or gauge, or by previous watering need history. For most varieties, but not all, of plants (or trees) which can be grown in container 10, usually soil 20 should be allowed to become fairly dry between waterings in order for fresh air (oxygen carrying air) to infiltrate the soil. Space 34 between the inner and outer walls 12, 28 at or near the bottom end of the container 10 is sealed or terminated with a water impervious sealing floor 36 so as to leave or render only transverse holes 16 through inner wall 12 as flow paths through which the water 19 enters soil 20 from space 34. In container 10 of FIGS. 1–3, sealing floor 36 between the walls 12, 28 is adjacent or slightly below the lower most transverse holes 16 in inner wall 12 so that space 34 between the walls 12, 28 does not retain any appreciable water below the lower most holes 16, unless as will be described, it is desireable to in effect lower floor 36 below holes 16 to hold some water on floor 36 for evaporation thereof into water vapor, intended only to increase the relative humidity in space 34, which would be acceptable within the scope of the invention since the water would not be standing on the plant roots nor would it be slowly and continuously fed into the soil 20 since the lower most holes 16 would be above the water held in space 34 for producing water vapor. The time period which water pours from space 34 through holes 16 into soil 20 after space 34 is intentionally filled with water will vary within the scope of the invention due to numerous factors such as and primarily soil 20 type and its percolation rate, and also possibly total open volume of transverse holes 16 and space 34 as well as drain holes 40, but I do not foresee water still moving from space 34 and flowing through the lower most holes 16 more than two hours after the space 34 has been intentionally filled, and usually all of the water in contact with holes 16 will have drained from space 34 through holes 16 within about 5 to 10 minutes when using a good quality potting soil 20 with a properly sized space 34, and proper total volume and individual volume hole 16 size. Heavy clay soils will greatly slow the rate of water passing through holes 16 from space 34 into the soil, compared to sandy soil or porus potting soil. In container 10 is a soil-support floor 38 at the bottom end of inner wall 12 or spanning across inner wall 12 which includes multiple drain holes 40 through which excess water having entered soil 20 may drain from the soil and container 10, and thereafter through which air may enter soil 20 from the bottom of the container. Soil 20 rests upon and is supported by floor 38, and as will become appreciated, floor 38 can be attached to inner wall 12 and separable from outer wall 28 and sealing floor 36, or alternatively, floor 38 may be in effect a perforated horizontal central and connected continuation of water impervious sealing floor 36 with inner wall 12 structured generally as an open ended tube and resting or supported on the perforated floor 38 as shown in FIG. 1. Multiple drain holes 40 in floor 38 in the bottom beneath soil 20 are preferred over a single larger more readily clogged hole, and the multiple drain holes 40 are preferably spaced apart from one another and spread generally uniformly across floor 38 and within the lower boundaries of inner wall 12 so that ambient air can enter through holes 40 in the bottom of container 10 and enter soil 20 at multiple bottom entry locations, as it should be appreciated at this time that an object of the invention is to provide very good aeration of soil 20. Although not shown in the drawings, it is permissable, within the scope of the invention, to apply one or two small holes vertically through sealing floor 36 for very slow drainage of water from space 34 to ensure, if it is desired, that even a small amount of standing water is not present resting atop floor 36 for any appreciable amount of time, such as sufficient time for significant bacterial and algae growth to occur, however the one or two holes if applied through sealing floor 36 must be sized in total volume such that with the normal intentional filling of space 34 with water at a typical and normal fill rate such as from a watering can or hose, such holes in floor 36 release water from container 10 so slowly that the space 34 filling rate is not significantly slowed. Such a drainage arrangement in sealing floor 36 may be a single $\frac{1}{64}$ inch round hole and may be desirable to release any standing water retained on floor 36 between the top of the floor 36 and the lower most hole(s) 16 in inner wall 12, such as might be due to the lower most hole 16 needing to be placed above a short vertical wall such as a vertical extension 42 shown in FIGS. 1 and 2 and to be described below, however, even if such very small drainage holes are applied through floor 36, due to the requirement of very low volume per time increment passage of water and not significantly slowing the filling rate of space 34, floor 36 is herein considered a sealing floor generally impervious to water passage because it holds or blocks (dams) the outflow of the water from the bottom end of space 34 sufficiently to allow the filling of space 34 and the vast majority of the water in space 34 to exit solely through holes 16 into soil 20. Other arrangements such as the raising of floor 36 to the top edge of the outer most vertical extension 42, and even further with the sloping of a raised floor 36 toward the lower most holes 16 such as indicated in FIG. 8 wherein floor 36 is defined by an inward and downward sloped curvature in outer wall 28 would also ensure generally an absence of long term water holding within space 34. Alternatively, as briefly mentioned above, container 10 can be structured to retain a small amount of water standing on sealing floor 36 in space 34 and below the lower most holes 16 in order to produce water vapor, since such an arrangement does not slow-feed water into the soil 20, nor do the roots 26 of the plant 24 in soil 20 continuously rest in the stored water in space 34. Various types of plants have somewhat differing watering requirements, and some plants may prefer the receipt of water vapor through holes 16 between waterings, while other types of plants may prefer very little water vapor entering the soil 20 through holes 16 so as to allow the soil 20 to become more dry between waterings. Climates will also be a factor. In excessively arid areas, a small amount of water remaining in space 34 will increase the relative humidity in the space and thereby slow soil 20 drying while having virtually no effect on aeration of the soil, and such would be some factors determining as to whether floor 36 and the surrounding structuring was structured to retain some water or whether all or most of the applied water on floor 36 was quickly drained as a liquid off of the sealing floor 36.

For the sake of positive clarity, the "bottom" of container 10 is that end which is oppositely disposed from the open end or open top of container 10 from which the plant 24 protrudes, and the bottom will normally rest upon a support surface, unless container 10 is hung from cordage or the like, which is certainly possible and feasible, with the bottom end being vertically below the upper open top end so that water in soil 20 is moved downward toward drain holes 40 by the forces of gravity.

Container 10 can be readily structure within the scope of the invention in many different sizes ranging from very small such as for holding approximately a pint of soil, on upward to hold twenty-five or more gallons of soil 20 such as might be used for small trees. Certain factors are considered when sizing space 34 relative to the overall interior soil containing area within inner wall 12. The volume or water holding capacity of the space 34 between the inner and outer walls 12, 28 is taken into account relative to soil 20 volume, as is the number and size of holes 16 in inner wall 12, and the size and number of drain holes 40, so that the user need only fill space 34 between the walls 12, 28 with water to the top of the outer or inner wall (or another a provided fill line or indicator) to properly water the plant, i.e., saturate soil 20 and flush-out inorganic salts with excess or flush water. The size and total water passing capability of the drain holes 40 must also be considered since it is desireable to saturate soil 20 but not to hold or store excess water in soil 20 for any appreciable time. Such considerations must of course assume a certain type of soil 20 for the highest level of accuracy, and if a known volume of a good quality commercial potting soil which is quite porus is assumed with a known approximate percolation rate and water holding capacity at saturation, then one has a good beginning point from which to figure the proper size of space 34, proper drain hole 40 total volume, and proper transverse hole 16 total volume, and in determining such volumes, one should also factor in a certain flush volume of water which can be poured into space 34 when filling the space and which is in excess of the water holding capacity of soil 20 in its saturated state (less the soil 20 volume above holes 16 which is to remain dry). Assuming soil 20 to be a quality commercial potting soil, quality potting soils being typically light in weight and porus, the volume of space 34 can be about 25 percent of the volume in inner wall 12 for holding soil 20, assuming all of the water poured into space 34 is in contact with holes 16, wherein with one gallon of held soil 20, space 34 would be about one quart or liter in volume, and this would be sufficient water in space 34 when transferred by gravity through holes 16 to both saturate soil 20 beneath the dry top surface and provide an acceptable amount of flush water. Typically dry commercial potting soil should initially moistened with its first placement in container 10 with extra water beyond the amount calculated as above described, since packaged commercial potting soils are extremely dry in the package and the potting soil once moistened will not become that dry again when growing a plant in the soil, or the plant will have been killed for lack of water. A flush volume of 5 to 25 percent above the holding capacity of soil 20 when saturated will normally be adequate, however factors such as soil type and quality of the water normally used can make it desireable to increase the flush water holding capacity of space 34 beyond the aforementioned 25 percent. For a good quality commercial potting soil and typical water quality, 10 percent flushing volume of water will usually function well to keep the level of inorganic salts in soil 20 within acceptable ranges. As skilled gardeners will recognize, such flushing water will inevitably reduce the nutrient content of soil 20 and thus will require the periodic addition of a fertilizer, which in this case will be added, when needed, to the water applied to space 34, since the top of soil 20 is to be kept dry as must as is reasonably possible. A liquid fertilizer mixed with the water 19 will usually function best to fertilize soil 20 and thus plant 24.

Generally speaking, it is the percolation rate of soil 20 which regulates the water flow rate through transverse holes 16, and holes 16 should provide sufficient open passageways to allow water to flow from space 34 into soil 20 generally as quickly as soil 20 can take the water. Drain holes 40, if necessary such as is more likely with short, wide containers 10, can be sized to slow, but not excessively slow, the out-flow of water from the soil 20 in order to ensure sufficient water level increase in soil 20 and lateral flow of water toward the center of soil 20.

Space 34 when sized properly, and then when filled with water within an anticipated approximate time frame, such as 10 seconds or so for a one gallon of soil holding size container 10 for example only, is filled with a proper amount of water to saturate soil 20 plus the additional "flush" volume of water 5 to 25 percent of the total applied water which will flow through soil 20 before flowing out of container 10 through drain holes 40. Drain holes 40 in total open volume are sized such that they will not significantly hinder the flow rate of excess water from soil 20, i.e., the flush water should all have exited soil 20 and container 10 usually within about 5 to 30 minutes, although up to a several hours would be acceptable. The prior mentioning of "time frame" is so that the reader understands that while water 19 is being applied into space 34, the first applied water is at the same time flowing out of space 34 through at least the lower most transverse holes 16, and thus if one applies the water into space 34 too slowly, one will increase the effective amount of flush water, which in most cases will not make any significant difference one way or the other, although if the water is applied into space 34 very slowly, such as with a drip system, then the level of water in space 34 does not rise to any significant elevation in space 34 to reach some or all of the holes 16 and thus the middle and higher areas of soil 20 will not become sufficiently and uniformly moist. It should be noted that space 34 needs to extend in elevation at least up the upper most holes 16 intended to receive water, and normally space 34 will be quite narrow between the inner and outer walls in order to allow the applied and proper amount of irrigation water to fill the space 34, resting on floor 36, to an elevation of at least initially upon the filling, reach the upper most holes 16. It should be further noted that the size or number of holes 16 may be greater near the upper end of inner wall 12 (space 34) compared to the size and number of the holes 16 near the bottom end of inner wall 12 (space 34) since the lower holes 16 will be exposed for a greater period of time to the receding water in space 34, and it is desirable to make sure that the soil 20 laterally outward from the upper most holes 16, below the top dry surface 22 of the soil, also becomes saturated and is flushed of excessive inorganic salts.

While water is flowing from drain holes 40 of container 10, ambient air is being drawn into soil 20 at the top 22 of the soil 20 and through the exposed upper holes 16 in inner wall 12 and through successively exposed lower holes 16 as the water level drops in the annular space 34. After soil 20 is saturated and the "flush" volume of water has drained from container 10, the top 22 of soil 20, the sides of soil 20 through transverse holes 16, and the bottom of soil 20 through drain holes 40 are all areas exposed to ambient air to provide very good aeration or air infiltration into soil 20 and thus the roots 26 of plant 24 from the multiple directions.

Figure 6:
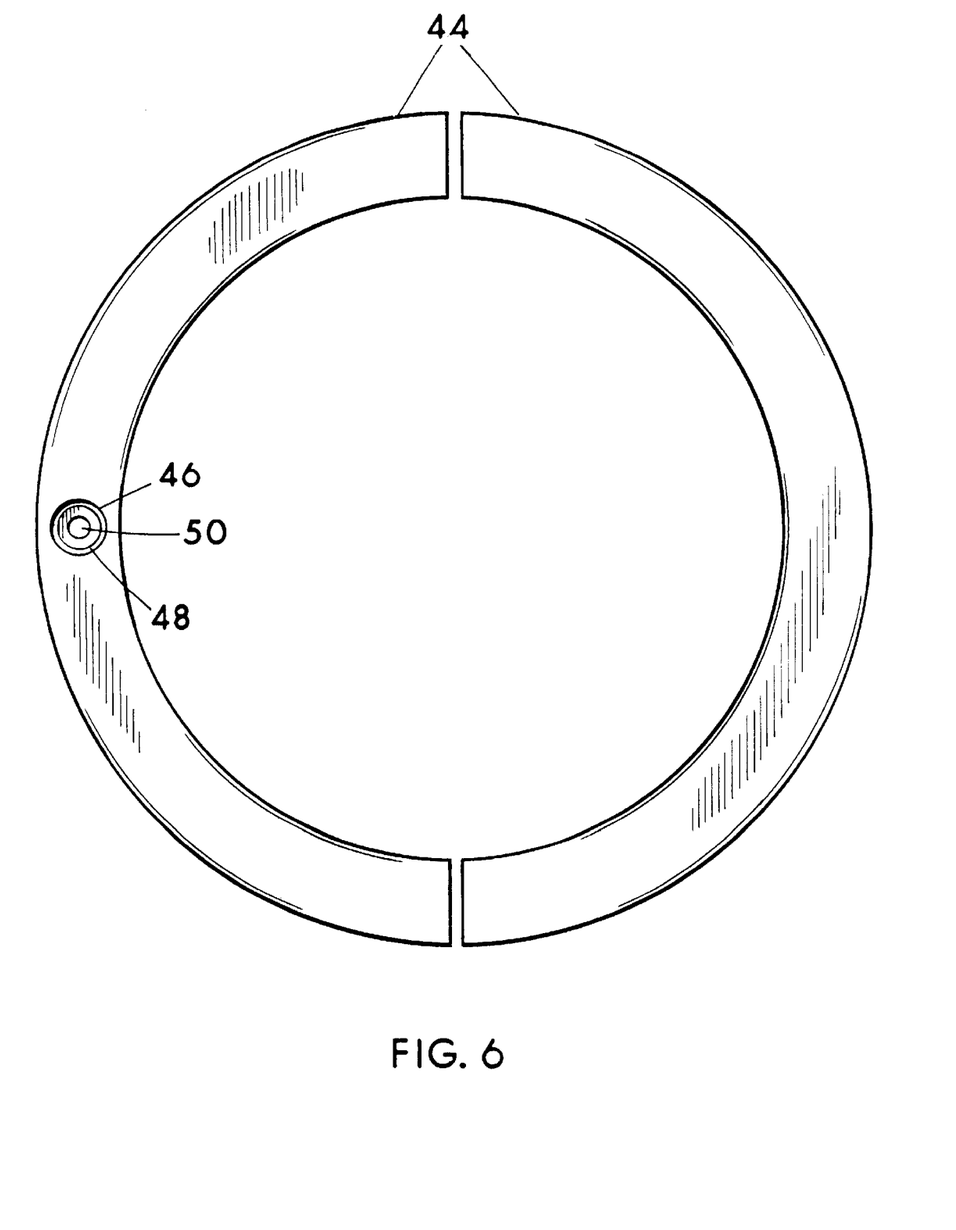
FIG. 6 is a top plan view of the optional cover which can be used on a pot in accordance with the present invention as indicated in FIG. 3 to cover a top opening of a space between the inner and outer walls.

Although container 10 does not hold a reservoir of water in which soil 20 and roots 26 rest or as a slow-feed watering arrangement for gradually metering liquid water into soil 20, it may be desirable under some circumstances to trap or increase the level of water vapor in space 34 through the use of a top cover 44. To allow some water vapor trapping, the water vapor created by either water resting on floor 36 or from soil 20 and passing through holes 16 (or both), an optional cover or cover panel 44 preferably with at least one hole 46 therein is provided for covering the top opening of the space 34 to aid in retaining water vapor while still allowing some air in-flow (and gas outflow) through the hole 46 in the cover 44 and then through the transverse holes 16 to reach soil 20. Cover 44 as shown in FIG. 6 is preferably a two-piece or split annular ring of two separate C-shaped panels when place adjacent one another defining a center opening to exposed the top 22 of soil 20 to air and to allow plant 24 to protrude therethrough, the split aspect being so that the cover 44 can be applied and removed from container 10 absent sliding it over the plant 24. Cover 44 need not necessarily be split or removable if used, and could be affixed and recessed slightly below the top edges 14, 30 of walls 12 and 28 and additionally serve to help stabilizes the upper ends of the walls 12, 28 relative to one another. As indicated for example in FIG. 3, the shown cover 44 rests atop the top edge 14 of inner wall 12 and spans across the top opening of space 34 to rest upon the aligned top edge 30 of outer wall 28. Cover 44 may be made of numerous different materials, although plastics are preferred. Cover 44 if used, is intended to trap at least some water vapors within space 34 while still allowing sufficient airflow from the top opening into space 34, and for convenience of use, cover 44 includes a hole 46 therethrough from its top surface through its bottom surface to allow the application of water into space 34 absent having to remove the cover. Hole 46 in cover 44 also serves as a vent, allowing sufficient air into enter space 34 such as for providing aeration of soil 20 through transverse holes 16 when space 34 is absent water, and space 34 is mainly absent water the vast majority of the time. The use of cover 44 is optional and factors pertaining to whether or not it is used include the type of soil 20 in container 10, and type of plant in container 10, whether or not some small roots of the plant 24 are extending through some of the holes 16, ambient air temperature about container 10 since cover 44 will tend to increase the air temperature within space 34, wind conditions about container 10 which effect water vapor content in space 34 and soil 20, and additionally, cover 44 may be perceived as aesthetically pleasing and may simply be used mainly for appearance sake. Hole 46 in cover 44 in FIG. 3 is shown extending through a tube-like structural component (tube 48) of and molded to the cover 44 with the tube 48 having the upper end hole 46 into which water is poured such as from a watering can spout or hose, and having a bottom hole 50 at the lower end of the tube 48 within space 34 from which the water exits the tube to enter space 34. The tube 48 allows water to stop flowing out of the tube when space 34 is properly filled with water, the backing-up of the water in the bottom end of tube 48 providing an easily seen visual indicator for the gardener to let the gardener know that space 34 is filled to a proper level, at which time the gardener stops applying water and eliminates the risk of water overflowing the top edges of either outer or inner walls 12, 28. A screen may be applied over hole 50 to block the passage of floating dirt and the like particles if desired. A cover, such as cover 44, over the top end of space 34 will also help prevent debris such as leaves and insects from falling into the space.

Figure 4:
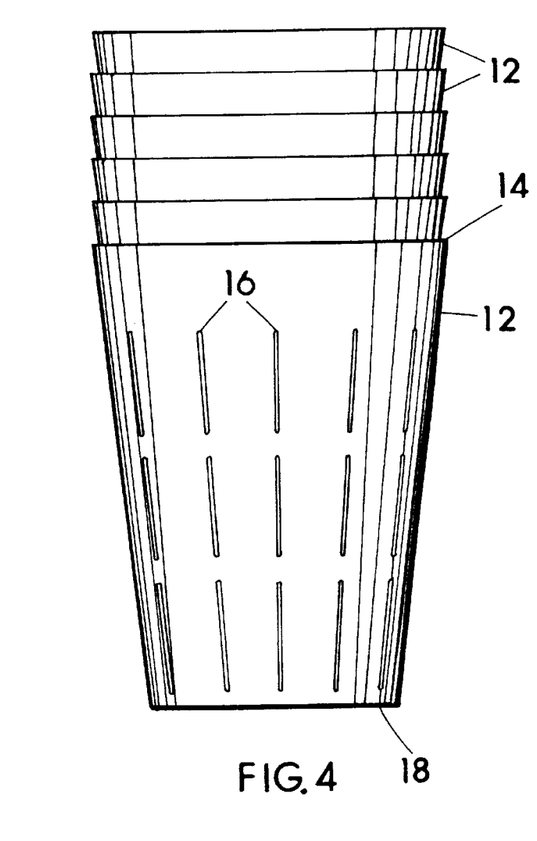
FIG. 4 is a side view of multiple container inner walls stacked or nested within each other for compact shipping and storing.
Figure 5:
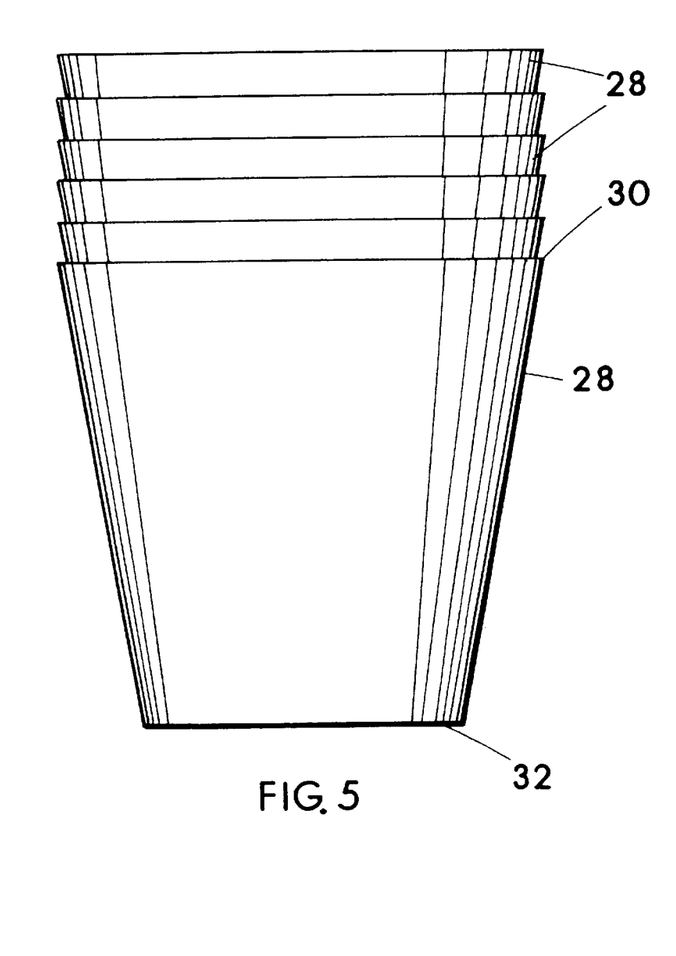
FIG. 5 is a side view of multiple container outer walls stacked or nested within each other for compact shipping and storing.

In a preferred embodiment, the inner wall 12 is slightly tapered toward its bottom end and is separable from the outer wall 28 for nested storage of multiple inner walls 12 for shipping and storing, and the outer wall 28 is tapered for nested shipping and storing of multiple outer walls 28 separate from inner walls 12. The tapering of inner wall 12 also allows the soil 20 and plant to be more easily removed if desired, such as when transplanting. FIG. 4 is a side view of multiple inner walls 12 stacked or nested within each other for compact shipping and storing, and FIG. 5 is a side view of multiple outer walls 28 stacked or nested within each other for compact shipping and storing. For use of container 10, an inner wall 12 is placed within an outer wall 28, the floors 36, 38 being present in the assembly, but potentially the floors 36, 38 being both connected to the outer wall 28 or with only the sealing floor 36 connected to the outer wall, and the perforated floor 38 being connected to inner wall 12 as will be further detailed. A container in accordance with the invention is preferably dismantlable as described above to allow lower volume consuming shipping with the inner walls 12 of many containers nested together, and the outer wall 28 of many containers nested together during shipping and storage.

Container 10, as well as any container in accordance with the invention can be made entirely of plastics such as thermoplastics or thermoset plastics to provide a container in a strong, lightweight and relatively inexpensive embodiment, although the use of material other than plastics such as pottery, composites, metal or even wood would be within the scope of the invention, but plastics in my opinion are clearly preferred for weight considerations in shipping and high volume low cost of manufacturing. Container 10 is shown in FIG. 2 is made entirely of plastics materials, which could be any of many suitable plastics such as ABS, styrene, polypropylene, polyethylene, PVC and the like. Preferably the plastics are UV light stabilized and useful within a wide range of temperatures. Injection molding, rotational and blow molding, thermal forming, are some methods of molding plastics which would be suitable for manufacturing all or portions of container 10. The making of holes in the plastics such as holes 16 and 40 can be formed in the molding process or created thereafter such as with a drill bit or the like.

In FIG. 2 inner wall 12 is structured as an open ended tube, and more specifically as a conically shaped tube having a taper from its larger upper end down to its smaller bottom end, and being open at both the top end and bottom end and absent floor 38 connected directly thereto. The bottom edge 18 of inner wall 12 is shown inserted into a snug-fit groove 41 defined between two short vertical extensions 42 or extending walls connected or formed as integral components of a horizontally disposed panel defining both floors 36 and 38 and connected as an integral component of outer wall 28. Inner wall 12 can be manually pulled upward, disconnecting from the frictional fit with extensions 42 to remove inner wall 12 such as for nested storage. Inner wall 12 can be reinserted to snugly engage with its bottom edge 18 in groove 41 for use of container 10. The engagement of inner wall 12 with the extensions 42 of groove 41 does not need to be one which is perfectly water tight, but one which is sufficiently water tight that most all of the water in space 34 in contact with holes 16 flows through holes 16 instead of through the engagement area of the bottom edge 18 of inner wall 12 with extensions 42. It should be noted that extensions 42 in FIGS. 1–3 are short so that holes 16 can be maintained vertically near sealing floor 36 so that, if desired, no appreciable amount of water is trapped upon sealing floor 36. Alternatively, as indicated in FIGS. 7–8, sealing floor 36 can be an integral part of outer wall 28 and have a large diameter central hole or opening therein sized and shaped for insertion, i.e., snugly receiving the bottom end of inner wall 12 which includes perforated floor 38 integrally connected to wall 12, with the snug fit being a frictional generally water tight fit, and arrangement which could allow for up and down sliding adjustment of inner wall 12 and holes 16 relative to floor 36 (see movement capability arrow 51 in FIGS. 7–8) to allow the gardener to adjust space 34 to either hold some water below the lower most holes 16 by raising the holes 16 relative to floor 36 by sliding wall 12 upward slightly relative to floor 36, or to have, such as more readily achieved with the sloped floor 36 shown in FIG. 8, all water directed through the lower most holes 16 wherein no water vapor creating water is stored in space 34. Other arrangements, such as with floors 36, 38 both as snap-on structures would be within the scope of the invention. It should be noted that drain holes 40 as previously described have been straight downward through bottom or soil-support floor 38, however within the scope of the invention, such as in an arrangement such as that shown in FIG. 7 wherein the bottom end of inner wall 12 with an attached floor 38 extends downward through and below a central opening in floor 36, drain holes 40 can be, although not shown in the drawing, horizontally through the bottom end of inner wall 12 at the juncture of inner wall 12 with soil-support floor 38.

In reference again to FIG. 1, since it is desireable to allow excess water (flush water and rain water) to readily flow out of soil 20, drain holes 40 should be position or arranged so that a surface upon which container 10 might be rested upon will not significantly block the drain holes 40, and therefor some structuring such as elevating rails 52 as shown in FIG. 1 for example should be applied, and in the shown example elevating rails 52 are integrally connected (molded onto) the juncture of the bottom edge 32 of outer wall 28 with sealing floor 36 and serve to hold floor 38 elevated in use. Elevating rails 52 terminate periodically to have lateral openings in the rails to allow water to flow away from the bottom of container 10. Also shown in FIG. 1 in cross section is a catch-pan 54 as can be used to capture and control any water leaving container 10 such as when the container 10 is over a surface which is not to get wet from the out flow of the flush water from container 10. Water standing within catch-pan 54 should not be allowed to rise to an elevation of drain holes 40, as this would block air infiltration into the bottom of soil 20.

FIG. 8 shows, in a cross sectional side view, a container or pot structured somewhat differently than container 10 of FIGS. 1–3, but still in accordance with the present invention. The upper end or top of the container shown in FIG. 7 can be structure just like that of container 10 of FIGS. 1–3 or alternatively can be structured like and appear as that shown in FIG. 8. The FIG. 8 embodiment shows inner wall 12 having holes 16 with the holes 16 brought basically to the top edge of the wall 12 with wall 12 absent a water impervious circumferential band about its top end wherein the means for preventing lateral in-flow of water onto the top surface of soil contained within wall 12 in this embodiment is the maintaining of the outer wall 28 top edge significantly below the top edge of the elevated inner wall so that space 34 in effect terminates significantly below the top surface of the soil and inner wall 12, the soil preferably filling inner wall 12 to its top or upper most edge. Additionally in the FIG. 8 embodiment, floor 38 with its drain holes 40 is connected to inner wall 12, and outer wall 28 steeply slopes or tapers inward at its lower or bottom end to define sealing floor 36, and then turns downward vertically to define a cylindrical open bottomed tube sized and shaped for frictional tight fit insertion, but preferably an adjustable sliding fit, of the lower end of inner wall 12 to provide an arrangement wherein the inner wall 12 can be raised and lowered by the gardener to raise or lower the lower most holes 16 relative to floor 36. It should be noted that holes 16 are not present through the lower most region of inner wall 12 in order to allow the upward positioning of the holes 16 slightly above the upper surface of floor 36 with the lower non-perforated portion of inner wall 12 engaged in the tubular portion of outer wall 28 beneath floor 36, the gardener being able to push and pull on the inner wall 12 to move it relative to outer wall 28 and floor 36 to allow the storage of some water upon floor 36 for the creation of water vapor within space 34, and alternatively, inner wall 12 can be moved downward by the gardener to position holes 16 right at the level of the adjacent sloped floor 36 to ensure that no water remains resting of floor 36. Extending legs rails 52 are again shown to help ensure drain holes 40 are always free to discharge water from the soil and container, and to allow the infiltration of air up into the soil. The FIG. 8 embodiment is dismantlable much like container 10 described above for nested storage of a plurality of inner walls 12 within one another, and nested storage of a plurality of outer walls 28 within one another for compact storage of a plurality of the containers such as for lower volume shipping. Inner wall 12 and its attached floor 38 in the FIG. 8 embodiment can be made of plastics materials, as can outer wall 28, however inner wall 12 and floor 38 could also be made of metal such as a perforated screen material for example.

It should be noted that the soil-support floor 38 spanning across or beneath inner wall 12 can be, within the scope of the present invention, well below a termination of inner wall 12 and floor 36 and in effect spanning across the bottom end of outer wall 28 carried downward below space 34 and floor 36 in a similar structural arrangement to that shown in the Hinrichs patent wherein the Hinrichs space C terminates well above a pot bottom-end floor having a drain hole, an arrangement wherein with the present invention the soil would in-part be against the inner wall and at lower elevations would be against the outer wall and below the sealing floor 36 of space 34, the lower level of the soil being irrigated by the downward flowing irrigation water entering the soil at the higher elevation of space 34, however such an arrangement may be more difficult to structure in a manner wherein the inner wall can be removed for nested storage in other inner walls.

For the sake of positive clarity of the method above disclosed in conjunction with the disclosure of novel plant container structures, the method for growing a plant in a container can be viewed, at least from one view point, as a method of irrigating and aerating soil in which a plant is growing to promote healthy growth of the plant, the soil contained within a container having an annular sidewall having transverse holes therethrough and having an open top end with the plant protruding from a top surface of the soil and top end of the container. The container further having a lower soil-support floor beneath the open top end and the soil; with steps including the saturating, over a period of less than two hours, the soil by applying water exclusively through the transverse holes; flowing excess or flush water into and through the soil by applying the excess water exclusively through the transverse holes with the excess water being a volume at least equal to 5% of the water applied to saturate the soil; and draining the applied excess water, within a period of less than two hours after applying the excess water, the draining of the water from the soil through an opening (preferably multiple openings) in the soil-support floor; and then exposing or being sure that the opening(s) in the soil-support floor, the transverse holes and the top surface of the soil are exposed to ambient air to allow air infiltration into the soil and some evaporation of water from the soil. The soil should thereafter be monitored for water content, and when sufficiently dry, but not too dry, the process or steps of saturating and flushing the soil, and then allowing good aeration of the soil should be repeated whenever needed to continue the plant growing or thriving. Fertilizer should be periodically added to the saturating and flush water. It should be remembered that the top surface of the soil should be maintained free of applied water by way of excluding lateral flow of the applied water onto the soil top surface during the steps of saturating and applying excess water to the soil.

The present containers and methods are most suited for indoor use, although outdoor use is certainly feasible with the recognition that rain water will alter many situations such as need for intentional waterings and flushing of inorganic salts, and the ability to maintain the top surface of the soil in a dry condition.

It should also be noted that in keeping the top surface of the soil relatively dry as described above which is generally for plants transplanted into the soil 20 and or already having roots 26 of sufficient length to be located in the area of the soil which is saturated from water via space 34 and holes 16, the present container would be difficult to start many varieties of seeds in the upper most soil levels absent applying water to the surface of the soil. For the starting of seeds, it would be an acceptable use of the container for a short period such as up to a couple of months to also apply water directly onto the surface of the soil to maintain the seed(s) and seedling(s) sufficiently wet, but after the roots 26 are extending downward in the soil 20 to an area laterally of at least the upper most holes 16, then water should be applied exclusively via space 34 and holes 16.

Although I have very specifically described the invention in detail, it should be understood that some changes in the specifics described and shown in my drawings may clearly be made without departing from the true scope of the invention in accordance with the claims.

I claim:

1. A container in which to grow a plant; said container comprising;

an annular inner wall including an upper end and defining an area in which soil can be contained with a top surface of the soil adjacent said upper end and exposed for infiltration of ambient air and for protrusion of a plant from the soil;

a plurality of holes transversely through said inner wall and of sufficient size and quantity for allowing lateral in-flow of water therethrough into soil contained by said inner wall at an in-flow rate primarily determined by percolation rate of soil contained by said inner wall;

an annular outer wall of water impervious material laterally surrounding said inner wall and in spaced relationship to said inner wall and defining a space between the inner and outer walls, an upper opening into said space allowing for water to be applied and for air to enter into said space;

a floor of water impervious material spanning between the inner and outer walls for allowing water applied into said space to fill said space;

a soil-support floor beneath said inner wall and including at least one opening therethrough for draining excess water from soil contained by said inner wall and for allowing air infiltration into the soil;

flow prevention means at said upper end of said inner wall for preventing lateral water flow from within said space onto a top surface of soil contained by said inner wall;

said space of a volume sufficient to be filled with water of sufficient volume in a single rapid filling operation to
(a) saturate soil contained by said inner wall below said flow prevention means and
(b) supply an additional excess volume of water equal to at least 5% of the sufficient volume to saturate.

2. A container in which to grow a plant according to claim 1 wherein said soil-support floor includes a plurality of openings for draining excess water from soil contained by said inner wall and for allowing air infiltration into the soil.

3. A container in which to grow a plant according to claim 2 wherein said container is made of plastics material.

4. A container in which to grow a plant according to claim 3 wherein at least some of said holes in said inner wall are at least 1/16 inch across.

5. A container in which to grow a plant according to claim 4 wherein said container can be dismantled to allow nested storage of a plurality of the inner walls of a plurality of the containers for allowing reduced volume storage.

6. A method of watering and aerating soil in a container in which a plant is growing to promote healthy growth of the plant, said soil within confines of a sidewall structure of said container, said sidewall structure having a plurality of transverse holes therethrough, said container having an open top end with said plant protruding from a top surface of said soil, said container having a lower soil-support floor beneath said open top end and said soil; said method comprising the steps of;

saturating, over a period of less than two hours, said soil below said top surface of said soil so as to leave said top surface of said soil un-watered by applying water through said transverse holes;

flowing excess water into and through said soil below said top surface of said soil by applying the excess water through said transverse holes with said excess water being a volume at least equal to 5% of said water applied to saturate said soil;

draining from said soil the applied excess water, within a period of less than two hours after applying the excess water;

exposing said transverse holes, said top surface of said soil and a bottom surface of said soil to ambient air to allow air infiltration into said soil from multiple directions.

7. A method of watering and aerating soil according to claim 6 further including applying water through said transverse holes in said annular sidewall for saturating said soil at a rate primarily determined by a percolation rate of said soil.

8. A method of watering and aerating soil according to claim 7 further including draining the applied excess water from said soil by allowing gravity to move the excess water downward from said soil and through a combination drain and air infiltration hole in said soil-support floor.

9. A container in which to grow a plant; said container comprising;

an inner wall structure including an upper end and defining an area in which soil can be contained with a top surface of the soil adjacent said upper end and exposed for infiltration of ambient air and for protrusion of a plant from the soil;

a plurality of holes transversely through said inner wall structure and of sufficient size and quantity for allowing lateral in-flow of water therethrough into soil contained by said inner wall structure at an in-flow rate primarily determined by percolation rate of soil contained by said inner wall structure;

an outer wall structure of water impervious material laterally surrounding in spaced relationship said inner wall structure;

a space laterally between the inner and outer wall structures, an upper opening into said space allowing for water to be applied and for air to enter into said space;

a floor of water impervious material spanning between the inner and outer wall structures for allowing water applied into said space to fill said space;

a soil-support floor beneath said inner wall structure and including at least one opening therethrough for draining excess water from soil contained by said inner wall structure and for allowing air infiltration into the soil;

flow prevention means at said upper end of said inner wall structure for preventing lateral water flow from within said space onto a top surface of soil contained by said inner wall structure;

said space of a volume sufficient to be filled with water of sufficient volume in a single rapid filling operation to
(a) saturate soil contained by said inner wall structure below said flow prevention means, and
(b) supply an additional excess volume of water beyond the sufficient volume to saturate.

* * * * *